United States Patent [19]

Balazar

[11] Patent Number: 4,929,963

[45] Date of Patent: May 29, 1990

[54] INK DELIVERY SYSTEM FOR INKJET PRINTER

[75] Inventor: Leonard Balazar, San Diego, Calif.

[73] Assignee: Hewlett-Packard Company, Palo Alto, Calif.

[21] Appl. No.: 240,786

[22] Filed: Sep. 2, 1988

[51] Int. Cl.[5] .......................... G01D 15/16; B41J 3/04

[52] U.S. Cl. .................................. 346/1.1; 346/140 R

[58] Field of Search .................................. 346/140, 1.1

[56] References Cited

U.S. PATENT DOCUMENTS

| | | | |
|---|---|---|---|
| 3,761,953 | 9/1973 | Helgeson | 346/140 X |
| 4,184,169 | 1/1980 | Taylor | 346/140 |
| 4,317,124 | 2/1982 | Shirato | 346/140 |
| 4,340,896 | 7/1982 | Cruz-Uribe | 346/140 |
| 4,380,770 | 4/1983 | Maruyama | 346/140 |
| 4,462,037 | 7/1984 | Banos | 346/140 |
| 4,568,953 | 2/1986 | Aoki | 346/140 |
| 4,658,272 | 4/1987 | Toganoh | 346/140 |
| 4,750,005 | 6/1988 | Platt et al. | 346/75 |

FOREIGN PATENT DOCUMENTS 50234 4/1979 Japan .

*Primary Examiner*—Joseph W. Hartary

[57] ABSTRACT

Ink is flowed through an ink flow channel of an inkjet print head, in a volume far greater than the volume required for printing purposes. The excess ink cools the print head and also aids in purging bubbles from the head. Ink for printing is extracted from the flow channel by capillary channels and conveyed to the ejection mechanism of the print head. In operation, ink from a stationary reservoir is circulated by a low-pressure pump through a particle filter and gas separator, and to the print head by a low-pressure trailing tube system, with the excess ink returned to the reservoir. The pressure of the ink at the capillary is maintained below atmospheric pressure, preferably utilizing hydraulic pressure created by locating the vented ink reservoir at a level below the print head. Leakage of ink from the print head is thereby prevented, and a positive ejection force is required.

16 Claims, 2 Drawing Sheets

INK DELIVERY SYSTEM FOR INKJET PRINTER

BACKGROUND OF THE INVENTION

This invention relates to printers, and, more particularly, to the ink delivery system for an inkjet printer.

Printers are used to print the output from computers and similar types of devices that generate information, onto a printing medium such as paper. The presently available types of printers use a variety of techniques to transfer ink to the printing medium in the desired pattern. Commonly available types of printers include impact printers, laser printers, and inkjet printers. An inkjet printer transfers ink to paper in the form of a fine stream or droplets from the source to the paper.

One popular type of inkjet printer is the thermal inkjet printer. In a typical thermal inkjet printer, a small volume of ink is contained within an ejection cavity in a print head that moves along a prescribed printing path. The ejection cavity has an electrical resistor in its wall. At a precisely timed point, an electrical current is passed through the resistor, causing the resistor to heat, in turn heating the ink immediately adjacent the resistor. Some of the heated ink is vaporized, expanding to drive a tiny droplet of ink out of the cavity to impact and deposit upon the paper.

The present invention deals with the manner in which ink is supplied to the print head. Numerous approaches have been utilized to provide ink to the print head. In one type of conventional inkjet printers, an ink supply is provided within a sack supported inside a container mounted upon the print head. The interior of the container is maintained at a pressure slightly below atmospheric pressure, so that the ink within the sack is also at a pressure slightly below atmospheric pressure. This reduced pressure is necessary to prevent the ink from leaking out of the print head in the absence of a heating pulse in the resistor.

Ink from the reservoir is drawn to the ejection cavity through a capillary. Exactly the right amount of ink to replace that ejected is drawn through the capillary, so that the ejection cavity is instantly refilled after a droplet is ejected. The sack reservoir system works well in many types of inkjet printers, and is the standard of the industry.

However, the conventional reservoir system has some disadvantages. Sometimes it is difficult to maintain the proper negative system pressure. The reservoir is mounted on the moving print head, so that the weight and cost of the print head, the mounts, and the traversing mechanism and its power supply are increased beyond what is otherwise necessary. Bubbles of air formed within the sack may be drawn into the capillary, resulting in interference with ink ejection by starving the ejector.

Another important concern with conventional inkjet printers is the buildup of heat in the print head. As each droplet is ejected from the print head, some of the heat used to vaporize the ink driving the droplet is retained within the print head. This heat can gradually build up, with the result that the change in temperature of the print head alters the ejection performance. That is, if the print head is operated at high speed and with the ejection of large amounts of ink, its temperature may become so high as to impair further operation. Heat buildup is one of the primary factors limiting the printing capacity, output quality, and speed of some inkjet printers.

There exists a need for an improved method of supplying ink to inkjet printers. The new approach would desirably avoid the problems encountered with the present ink supply system, and additionally would contribute to solving the heat buildup and bubble accumulation problems. The present invention fulfills this need, and further provides related advantages.

SUMMARY OF THE INVENTION

The present invention provides an improved ink supply system for an inkjet printer. The new system has a stationary ink source not located on the moving print head carriage, so that the weight of the carriage is reduced as compared with a system wherein the ink source is mounted on the carriage. It provides direct control of the reduced pressure at the print head, ensuring that the pressure is correct, and further providing adjustability for conditions such as use at elevated altitudes. Air bubbles are, to a great extent, automatically purged from the system, so that incidence of plugging of channels by air bubbles is reduced. The ink may also be filtered before introduction into the capillary, reducing the possibility of plugging due to foreign matter. Significantly, the present system aids in maintaining an acceptably low and uniform temperature of the print head and purges bubbles from the ink, permitting greater printing speeds and volumes. The approach of the invention utilizes components that are not complex or expensive.

In accordance with the invention, a thermal ink jet printer comprises a print head having an ink ejector including a cavity suitable for containing ink and a resistor adjacent the cavity to heat the ink in the cavity upon passage of an electrical current through the resistor, an ink-flow channel through which ink can flow, and a capillary channel communicating at one end with the ink flow channel and at the other end with the cavity of the ink ejector; a pump that pumps ink; an ink reservoir that holds a supply of ink, the ink reservoir being located below the cavity of the ink ejector; an ink supply tube extending from the high pressure side of the pump to one end of the ink flow channel; a first ink return tube extending from the other end of the ink flow channel to the reservoir; and a second ink return tube extending from the reservoir to the inlet side of the pump. As used herein, the term "below" means that one of two communicating elements is positioned at a lesser height above the center of the earth than the other communicating element, so that there is a hydrostatic head and pressure difference between the two elements.

More generally, a printer comprises print head means for printing figures upon a printing medium, the print head means including ejection means for ejecting ink toward a print medium, and supply means for withdrawing a portion of the ink from a stream of ink delivered to the print head means, and for supplying the withdrawn portion to the ejection means; and delivery means for circulating the stream of ink through the print head, the delivery means including pump means for applying a pumping pressure to force the stream of ink to the print head means, return means for returning the portion of the ink not withdrawn by the supply means back to the pump means for recirculation back to the print head means, and pressure control means for maintaining the pressure of the flow of ink below atmospheric pressure, at the point of the supply means.

In the present printer, the pump continuously circulates a volume of ink that is much larger than required by the print head for printing. The circulated volume of ink is typically over 1000 times greater than the volume ejected by the print head in a comparable time period. The ink flows from the pump to the ink flow channel of the print head, and then back to the pump, by way of the reservoir. In the print head, a capillary channel communicates at one end with the ink flow channel and at the other end with the ejection cavity, so that precisely the correct amount of ink is drawn out of the ink flow channel and into the cavity to replace the ink ejected.

In this printer, as with any thermal inkjet printer, it is important that the pressure of the ink in the cavity be below atmospheric pressure. If the pressure were equal to or above atmospheric, the ink would leak or be forced out of the cavity even in the absence of heating of the resistor, resulting in leakage and possibly poor print quality. The presently preferred approach utilizes a vented ink reservoir having an ink level located physically below (that is, at a lesser height above the center of the earth) the print head cavity to control the pressure in the cavity to a selected level below atmospheric. The ink reservoir is in the pump loop downstream of the print head, so that the excess ink not drawn into the capillary tube flows out of the print head and to the reservoir through the first return tube. The first return tube delivers ink to the vented reservoir at atmospheric pressure, so that, considering the hydrostatic head in the first return tube and the pressure loss due to flow resistance within the tube, the pressure in the ink flow channel and in the print head ejection cavity is less than atmospheric.

This configuration also provides a readily controlled means for adjusting the pressure in the ink flow channel and the ejection cavity. The reservoir is simply raised or lowered to change the hydrostatic head in the first return tube, thereby changing the pressure in the ink flow channel and the ejection cavity in the opposite direction and by an equal amount. The operating pressure in the ejection cavity may thereby be adjusted readily in the design of the printer. The optimum negative pressure is presently believed to be about 100–130 millimeters of hydrostatic head of water, which results in a smooth flow of ejected ink without leakage, in a typical thermal inkjet printer having a 43 micrometer diameter ejection nozzle.

The present invention also provides for a gas separator in the ink flow circuit, which removes vapor and bubbles from the ink. The formation of bubbles in liquid ink in ink jet printers has been an ongoing problem, because a bubble can block a capillary and starve the ink ejector. The filter that removes particulates from the ink also includes a separator that removes gas from the ink as it circulates, preventing blockage of the particle filter with air, and reducing the likelihood that a bubble can form within the print head.

The approach of the present invention is readily contrasted with prior approaches. In most conventional low pressure thermal ink jet printers, the ink is contained in a sack located within an airtight enclosure, or alternatively in a holding tank fed by tubes, all of which sits upon the print head carriage. Only enough ink is delivered to the print head to replace that ejected. There is no flow to the print head greater than the ejected amount of ink. Negative pressure control at the print head is maintained with a pressure bulb, vacuum pump, or periodic automatic mechanism.

These approaches, while operable and in widespread use, have several disadvantages that are overcome with the present approach. The ink supply or holding tank does not sit upon the print head carriage in the present approach, reducing the weight of the print head carriage and making its movement easier. The reduction of weight is particularly advantageous for large ink jet printers used for large drawings and for high speed printers. It is not necessary to interrupt printing when ink must be added in the present printer. The present recirculating ink flow also is effective in moving bubbles in the ink flow lines and the print head to the reservoir, where they are returned to atmosphere with little chance of blocking a channel and causing interruption of printing by starving the ejector of ink. With a squeeze bulb or vacuum pump approach, it is difficult to control negative pressure accurately and reproducibly. The present printer maintains the negative pressure constant and also permits it to be readily controlled, due to the dominance of the hydraulic head and the adjustability feature of the reservoir height.

A recirculating ink approach has been used previously in some IBM ink jet printers, but it was of a high pressure type where substantially all of the ink flowed to the ejection cavity to be ejected out of the print head. A portion of the ink was electrostatically deflected to the printing medium, and another portion deflected to a return channel and back to the pump, or to a sump. The present approach differs, in that it is a low pressure system of up to about 400 millimeters of water maximum pressure generated by the pump, which may occur when filling an empty tube system. That is, the pressure in the present system is never more than about +0.6 psi (pound per square inch) above atmospheric, and normally closer to −0.2 psi below atmospheric, while the operating pressure of high pressure systems such as the IBM system is about +60 psi. Most of the ink in the present approach flows back to the pump without being ejected from the print head, and only enough ink is drawn to the ejection cavity to replace that ejected. The present approach is suitable for use with a thermal inkjet printer, while the prior approach is not. The present approach also requires a smaller pump, and is less likely to cause leakage.

Other features and advantages of the invention will be apparent from the following more detailed description, taken in conjunction with the accompanying drawings, which illustrate, by way of example, the features of the invention.

DETAILED DESCRIPTION OF THE PREFERRED EMBODIMENT

Figure 1:
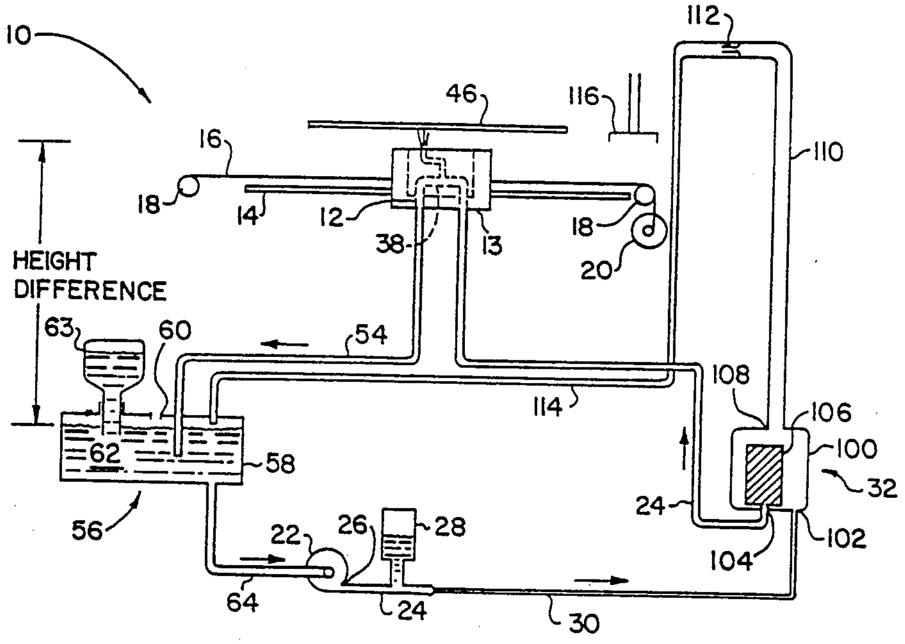
FIG. 1 is a pictorial depiction of the printer of the invention and its ink flow path.

The present invention is embodied in a printer 10 whose components are depicted in FIG. 1. The printer 10 includes a print head 12 mounted on a carriage 13, which in turn is slidably mounted on a print head support bar 14. The carriage 13 is slidably moved on the bar 14 by cables 16 attached to the carriage 13. The cables 16 extend over pulleys 18 and are operated by a motor 20.

Ink is pumped to the print head 12 by a pump 22. (As used herein, the term "ink" means any liquid that is ejected by the print head to record information on a medium. The term "ink" is not limited to any narrow meaning as may be used in portions of the printing art.) An ink supply tube 24 extends from a delivery port 26 of the pump 22 to the print head 12. The pump 22 is preferably a double-acting piston pump, but may be a peristaltic pump or of any other acceptable type. The pump preferably produces a pressure of up to the equivalent of about 400 millimeters of ink pressure head, or 0.6 pounds per square inch, at its delivery port 26.

The ink supply tube 24 may be a straight length of tubing, but preferably includes several modifications that improve the quality of the ink flow. A typical pump 22 supplies ink with time variations in pressure as the pump goes through its operating cycle. To reduce the variations in pressure, an accumulator 28 communicates with the ink supply tube 24 adjacent the delivery port 26. The accumulator 28 includes an air space above a liquid head, so that increases in pressure are resisted by the compression of the air within the air space. As a further aid in reducing pressure variations, the ink supply tube includes a length 30 of reduced diameter, downstream of the accumulator 28, through which the ink flows on its way to the print head 12. Together, the accumulator 28 and the length of tubing of reduced diameter 30 act in a manner similar to a capacitor and a resistor, respectively, in an electrical circuit to reduce surges and produce a smooth flow of ink.

A filter/gas separator 32 is preferably placed in the ink supply tube 24 between the pump 22 and the print head 12. As the ink flows there through, the filter 32 removes particulate contaminants from the flow of ink, as well as gas bubbles and some of the dissolved gas. The filter/gas separator 32 includes a container 100 with an inlet 102 and an outlet 104. Ink flows into the filter/gas separator 32 through the inlet port 102, from the reduced diameter length 30, and flows out of the filter/gas separator 32 through the outlet 104, to the print head 12. Between the inlet 102 and outlet 104 there is a filter element 106 through which the ink must flow. Particulates are removed from the ink by the filter element. A filter element 106 having 25 micrometer filter pores has been found sufficient.

Under the pressure produced by the pump 22, the ink fills the container 100. Any bubbles in the ink rise to the upper portion of the interior of the container 100. Because the ink flows from a constricted volume in the reduced diameter length 30 into the larger volume of the container 100, there is a reduction in pressure so that a part of the dissolved gas in the ink forms bubbles, which also float to the top of the container 100. A gas separation port 108 is provided in the top of the container 100, of diameter sufficiently large that the bubbles can float upwardly into a communicating gas removal tube 110. A diameter of 8 millimeters has been found sufficient for the port 108 and tube 110 to permit the upward flotation of bubbles.

Ink also flows upwardly through the port 108 and the tube 110, under the pressure of the pump 22. The hydrostatic pressure in the system rises accordingly. At the top of the tube 110, a restriction 112 is placed in the tube 110. The restriction 112 is a tube of much smaller diameter than the tube 110. In practice, an internal diameter of 0.6 millimeters and length of 35 millimeters has been found satisfactory for the restriction 112. Any gas bubble must overcome the capillarity of the restriction 112 to flow into a duct 114 that delivers gas and ink from the restriction 112 to the ink reservoir, dumping the ink at a level above the liquid ink level in the reservoir so that ink is not drawn back up the duct 114 at shutdown.

The restriction 112 also adds a further back pressure to the ink in the container 100, the back pressure being less than the pressure in the container in the absence of the port 108, but greater than the pressure in the container in the absence of the restriction 112. If the return tube 54 is blocked and the speed of operation of the pump 22 is sufficiently increased, this design permits the ink pressure at the print head 12 to be raised above atmospheric pressure, when desired. Increasing the pressure above atmospheric pressure causes continuous ejection of ink, also ejecting any bubbles that may have found their way into the ink flow channel and capillary system. A positive pressure ejection system for clearing bubbles at system startup or at desired intervals is thereby provided. The positive pressure mode of operation could be conducted, as for example at startup or when impaired operation due to bubbles is detected, by moving the print head 12 to a service station area at one end of the carriage traverse. At the service station, there would be an ink sump 116 into which ink is ejected under the positive pressure to clear the system of bubbles. After this purging, the print head 12 would be operated in the normal fashion, as described.

The flow restriction approach also aids in separating bubbles from the ink, and removing them from the ink so that they will not be forced through the filter element 106 and to the print head 12. Absent the gas separation function of the filter/gas separator 32, it is conceivable that the container 100 would eventually fill with gas and choke the ink flow.

Figure 2:
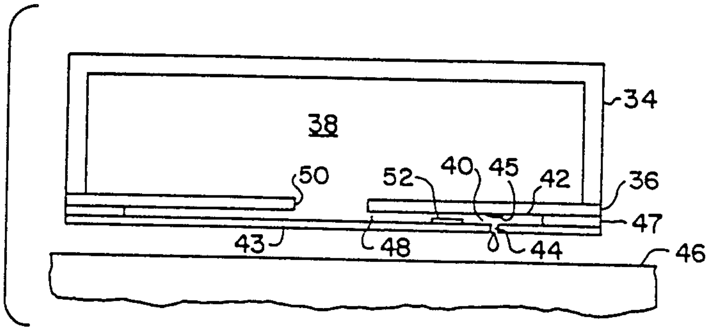
FIG. 2 is a side sectional view of a print head in accordance with the invention.

The internal structure of the print head 12 is depicted more fully in FIG. 2. The print head 12 includes a support plate 34 to which a substrate 36 is attached. An ink flow channel 38, depicted in section in FIG. 2, is formed in the support plate 34. Ink pumped by the pump 22 flows through the ink supply tube 24 and thence into and through the ink flow channel 38.

The print head also has at least one, and usually a plurality of, ink ejectors, preferably including an ejector cavity 40 adjacent the outwardly facing surface 42 of the substrate 36. A nozzle plate 43 overlies the surface 42 and is separated therefrom by a spacer 47. The nozzle plate 43 has an opening therethrough as an orifice 44. Ink is driven from the cavity 40 outwardly through the orifice 44 to strike a medium 46 placed adjacent the print head 12. A thin film electrical resistor 45 is formed in one wall of the cavity 40. The ink within the cavity 40 is heated upon command by passing an electrical current through the resistor 45. When the current is sufficiently great, a portion of the ink is vaporized, driving a droplet of ink out of the cavity 40 to impact against the medium 46.

Ink is supplied from the ink flow channel 38 to the ejection cavity 40 by a capillary channel 48. The capillary channel 48 communicates at one end with the ink flow channel 38, and at the other end with the cavity 40.

Capillary forces draw ink from the ink flow channel 38, through the capillary channel 48, and into the cavity 40. The amount of ink that is drawn from the ink flow channel 38 into the capillary channel 48 is determined by, and is exactly equal to, the amount of ink ejected from the print head 12. No separate pump, regulator, or control is required. The dimension of the capillary channel 48 must be sufficiently small that capillary forces are operable to effect the drawing of ink from the flow channel 38.

The capillary channel may be branched at several locations, so that ink may be fed to multiple cavities, since most print heads contain a plurality of such ejectors and cavities. In a typical preferred operating print head 12, the capillary channel 48 includes a main feed channel 50 portion located closest to the ink flow channel 38, and several secondary channels 52 from the main feed channel 50 to the individual cavities 40. (Alternatively, a large number of individual capillary channels could extend from the ink flow channel to each individual cavity.) By way of illustration and not of limitation, in one print head 12 made in accordance with the invention, the main feed channel 50 has a width of about 1 millimeter, and the secondary channel 52 has a width of 58 micrometers. The orifice 44 has a diameter of 43 micrometers.

Only a very small portion of the ink passing through the ink flow channel 38 is withdrawn through the capillary channel 48. Typically, the volumetric flow of ink withdrawn through the capillary channel 48 is less than 0.1% of the volumetric flow of ink through the ink flow channel 38. The remainder of the volume of ink, not withdrawn into the capillary channel 48, returns to the reservoir for recirculation, in the manner shown in FIG. 1.

A first ink return tube 54 extends from the outlet side of the print head 12, more specifically from the outlet side of the ink flow channel 38 in the print head, to a reservoir 56. A volume of ink 62 is contained within the reservoir 56. The first return tube 54 empties into the reservoir at a point below the level of the ink 62. One particular advantage of the present invention is that the volume of ink contained within the reservoir may be made quite large, so that the printer may run for long periods without adding ink. An ink fill bottle 63 maintains the level of ink 62 constant. When ink must be added, the bottle 63 is replaced in the manner of an office water cooler. It is not necessary to interrupt operation of the printer when the ink supply is replenished.

The first ink return tube 54 communicates with the reservoir 58 below the level of ink 62. Ink from the print head 12 flows into the container 58 and is added to the volume of ink 62 in the reservoir 56. In this manner, the pressure in the return tube 54 is established, and any bubbles in the ink flowing in the return tube 54 are released to atmosphere when the ink enters the container 58.

At the same time, ink is withdrawn from the volume of ink 62 through a second ink return tube 64. The second ink return tube 64 communicates at one end with the container 58 near its bottom, so that it is below the surface of the ink 62, and at its other end with the suction or input side of the pump 22. The pump suction draws ink out of the reservoir 56, into the pump 22. The pump 22 pumps the ink out under pressure through the ink supply tube 24, the ink flow channel 38 (from which a small amount of ink is withdrawn by the capillary channel 48), the first ink return tube 54, and back into the reservoir 56.

The ink reservoir 56 is physically positioned below the print head 12. This causes the pressure in the communicating cavity 40 of the print head 12 to be below atmospheric pressure. (As used herein, "positive" and "negative" pressures are in reference to atmospheric pressure.) At the point of the reservoir 56, the pressure in the first ink return tube 54 is atmospheric. The pressure produced by the column of ink in the ink return tube 54 is subtracted from atmospheric pressure, to determine the pressure in the cavity 40 of the print head 12 when no ink is flowing. This pressure in the cavity 40 is therefore less than atmospheric pressure at low ink flow rates where the pressure drop in the return tube 54 due to flow restrictions is less than the hydraulic pressure due to the difference in height. This is the desired result to prevent leakage and draining of ink from the cavity 40 through the nozzle 44 and to maintain the correct negative pressure for the ink flow dynamics within the ink ejection chamber in the head 12. If negative pressure relative to atmospheric pressure is not maintained in the cavity 40, there can be loss of ink even when though no heating is provided by the resistor 45. The magnitude of the negative pressure is determined by the height difference between the level of the ink within the reservoir 56 and the location of the print head 12. (Other effects such as pressure drops along the length of the tube may also be present, but these are generally small in magnitude in the present system and may be effectively discounted in the analysis.)

Any other operable method of producing a negative pressure in the ink at the print head is also acceptable, if compatible with the ink flow system of the invention.

The ink flow approach of the invention permits the designer to have direct control over the magnitude of the negative pressure at the print head, simply by moving the reservoir 56 up or down. Present experience for a particular head has shown that the reservoir 56 should be positioned below the print head 12 so as to produce a negative pressure of about 100–130 millimeters of ink hydrostatic pressure (which corresponds to a negative pressure of about 0.14–0.19 pounds per square inch).

The flow of ink through the print head removes heat from the print head to the reservoir, permitting maintenance of a low, stable operating temperature in the print head regardless of high printing demand. Bubbles of air in the ink are purged continually from the system, avoiding a problem with blockage of the system with air bubbles that has been observed in some prior ink jet printers. Because the ink reservoir, pump, and other elements of the ink supply system are mounted on the frame of the printer and not on the print head or print head carriage, the weight of the print head and print head carriage are kept low. Consequently, the requirement for strength in the print head support structure is reduced, and the print head movement may be made more responsive to commands because of the reduced mass.

Figure 3:
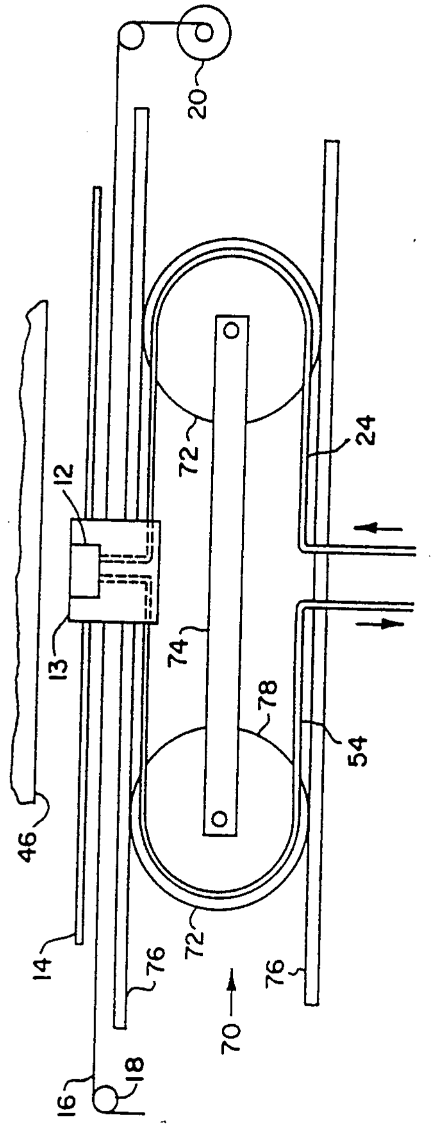
FIG. 3 is a plan view of the print head and trailing tube arrangement for managing the movement of the ink supply and return lines.

To lead the ink supply tube 24 and the first ink return tube 54 to the print head 12, a supply management mechanism 70 has been devised, as illustrated in FIG. 3. A pair of pulleys 72 are mounted to a traveling support 74. The pulleys 72 roll on two parallel tracks 76. Each pulley 72 has a concave outer surface 78, so that the respective tubes 24 and 54 can be threaded over the pulleys 72. The tracks 76 are parallel to the support bar 14 upon which the print head 12 and carriage 13 are supported, with one of the tracks 76 adjacent to the support bar 14. The tubes run over the pulleys 72 to the print head 12, where they communicate with the inflow and outflow sides of the ink flow channel 38. As the print head 12 is moved along the support bar 14 by the motor 20, the tubes 24 and 54 roll over the pulleys 72 as they turn. For each unit distance the print head 12 travels, the traveling support 74 moves half as far in the same direction. This arrangement holds the tubes 24 and 54 at constant heights and maintains an orderly connection to the print head 12. Kinking of the tubes 24 and 54, or entanglement of the tubes with each other or other parts of the mechanism, which would affect ink flow, is avoided.

This present invention provides ink to the print head in a highly controllable manner that is particularly conducive to the construction of large, high output printers. Although a particular embodiment of the invention has been described in detail for purposes of illustration, various modifications may be made without departing from the spirit and scope of the invention. Accordingly, the invention is not to be limited except as by the appended claims.

What is claimed is:

1. A printer, comprising:

print head means for printing figures upon a printing medium, the print head means including ejection means for ejecting ink toward a print medium, and supply means for withdrawing a portion of the ink from a flow of ink delivered to the print head means, and for supplying the withdrawn portion to the ejection means; and delivery means for circulating the flow of ink through the print head means, simultaneously with the operation of the ejection means, the delivery means including pump means for applying a pumping pressure to force the flow of ink to the print head means, return means for returning the portion of the ink not withdrawn by the supply means back to the pump means for recirculation back to the print head means, and pressure control means for maintaining the pressure of the flow of ink below atmospheric pressure, at the point of the supply means.

2. The printer of claim 1, wherein the supply means includes an ink flow channel through which the stream of ink passes, and a capillary channel communicating with the ink flow channel at one end and with the ejection means at the other end.

3. The printer of claim 1, wherein the ejection means includes a cavity to which ink is delivered by the supply means, and which has an ejection port through which a droplet of ink may be ejected, and heating means for heating the ink in the cavity so that a portion of the ink is vaporized and ink is ejected through the ejection port.

4. The printer of claim 1, wherein the delivery means further includes a filter through which the stream of ink flows to remove particulate matter therefrom.

5. The printer of claim 1, wherein the delivery means further includes a bubble and gas separator to remove gas from the ink.

6. The printer of claim 1, wherein the pressure control means includes an ink reservoir disposed at a position below the print head means, the reservoir receiving the stream of ink from the print head means and providing a supply of ink to the input of the pumping means.

7. The printer of claim 1, wherein the pumping means includes a pump that pressurizes ink and forces it toward the print head.

8. The printer of claim 7, wherein the pumping means includes a supply tube that conducts the ink from the pump to the print head.

9. The printer of claim 8, wherein the supply tube includes a main supply tube having a main tube internal diameter, and a resistor tube having an internal diameter less than the main tube internal diameter.

10. The printer of claim 7, wherein the pumping means includes a gas accumulator in communication with the output of the pump.

11. A thermal ink jet printer, comprising:

a print head having an ink ejector including a cavity suitable for containing ink and a resistor adjacent the cavity to heat the ink in the cavity upon passage of an electrical current through the resistor, an ink flow channel through which ink can flow, the ink flow channel being disposed such that ink flowing therethrough is heated by heat produced by the ink ejector, and a capillary channel communicating at one end with the ink flow channel and at the other end with the cavity of the ink ejector;

a pump that pumps ink simultaneously with the operation of the ink ejector during printing operation of the ink jet printer;

a stationary ink reservoir that holds a supply of ink, the ink reservoir being located at a level below the cavity in the ink ejector;

an ink supply tube extending from the high pressure side of the pump to one end of the ink flow channel;

a first ink return tube extending from the other end of the ink flow channel to the reservoir; and a second ink return tube extending from the reservoir to the inlet side of the pump.

12. The printer of claim 11, further including a filter through which the ink passes as it flows from the high pressure side of the pump to the low pressure side of the pump.

13. The printer of claim 11, wherein the supply tube includes a main supply tube having a main tube internal diameter, and a resistor tube having an internal diameter less than the main tube internal diameter.

14. The printer of claim 11, further including a gas accumulator in communication with the output side of the pump.

15. A process for supplying ink to an ink jet printer, comprising the steps of:

supplying an ink jet print head, from which droplets of ink may be ejected, the ink jet print head having an ink flow channel therethrough;

pumping ink through the ink flow channel of the print head to provide ink for ejection and to cool the print head, as the print head operates during printing, at a flow rate greater than required to supply the printing requirements of the print head, while maintaining the pressure of the ink in the ink flow channel of the ink jet print head below atmospheric pressure; and withdrawing a portion of the ink flowing through the ink flow channel for ejection from the print head.

16. The process of claim 15, wherein the pressure of the ink in the ink flow channel is maintained below atmospheric pressure by venting the ink to atmospheric pressure at a level below that of the print head.

* * * * *